(12) United States Patent
Ye et al.

(10) Patent No.: US 11,303,482 B2
(45) Date of Patent: Apr. 12, 2022

(54) SIGNAL PROCESSING APPARATUS AND METHOD, NETWORK DEVICE AND COMPUTER READABLE STORAGE MEDIUM

(71) Applicant: Nokia Solutions and Networks Oy, Espoo (FI)

(72) Inventors: Chenhui Ye, Shanghai (CN); Dongxu Zhang, Shanghai (CN); Kaibin Zhang, Shanghai (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/759,136

(22) PCT Filed: Oct. 24, 2018

(86) PCT No.: PCT/CN2018/111705
§ 371 (c)(1),
(2) Date: Apr. 24, 2020

(87) PCT Pub. No.: WO2019/080880
PCT Pub. Date: May 2, 2019

(65) Prior Publication Data
US 2021/0176100 A1    Jun. 10, 2021

(30) Foreign Application Priority Data
Oct. 26, 2017    (CN) .......................... 201711012660.1

(51) Int. Cl.
*H04L 25/08*    (2006.01)
*H04B 1/38*    (2015.01)

(52) U.S. Cl.
CPC ............... *H04L 25/08* (2013.01); *H04B 1/38* (2013.01)

(58) Field of Classification Search
CPC .................................. H04L 25/08; H04B 1/38
See application file for complete search history.

(56) References Cited

U.S. PATENT DOCUMENTS

| | | | | |
|---|---|---|---|---|
| 7,064,790 B1 * | 6/2006 | Varma | .................... | H04N 7/012 348/441 |
| 2010/0091688 A1 * | 4/2010 | Staszewski | ............... | H04L 5/06 370/277 |

(Continued)

FOREIGN PATENT DOCUMENTS

| | | |
|---|---|---|
| CN | 107276647 A | 10/2017 |
| EP | 2574138 A1 | 3/2013 |

OTHER PUBLICATIONS

International Search Report for PCT/CN2018/111705 dated Jan. 21, 2019.

*Primary Examiner* — Dac V Ha
(74) *Attorney, Agent, or Firm* — Fay Sharpe LLP

(57) ABSTRACT

Embodiments of the present disclosure provide a signal processing apparatus and method, a network device and a computer readable storage medium. The apparatus comprises: a receiving unit configured to receive a signal from a remote radio frequency unit (RRH), the RRH being independent from the signal processing apparatus; a processing unit configured to perform signal enhancement on the signal; and a transmitting unit configured to transmit the enhanced signal to a baseband unit (BBU). According to the present disclosure, it is possible to implement a fronthaul or anyhaul solution with a high reliability, and meanwhile save the RF transmission power of the terminal device and reduce the operation costs of the operators.

10 Claims, 3 Drawing Sheets

(56) References Cited

U.S. PATENT DOCUMENTS

| | | | |
|---|---|---|---|
| 2014/0198684 A1* | 7/2014 | Gravely | H04L 43/18 370/254 |
| 2014/0286256 A1 | 9/2014 | Chowdhury et al. | |
| 2015/0341802 A1 | 11/2015 | Chiang et al. | |
| 2018/0097659 A1* | 4/2018 | Hanson | H04L 12/5601 |
| 2019/0341970 A1* | 11/2019 | Lange | H04L 67/10 |
| 2020/0366542 A1* | 11/2020 | Barbieri | H04L 29/10 |

* cited by examiner

150# SIGNAL PROCESSING APPARATUS AND METHOD, NETWORK DEVICE AND COMPUTER READABLE STORAGE MEDIUM

FIELD

Embodiments of the present disclosure relate to the field of wireless communications, and more specifically to a signal processing apparatus and method, a network device and a computer readable storage medium.

BACKGROUND

As the $5^{th}$ generation mobile communication (5G) era comes, a solution of wireless access and fiber based fronthaul or anyhaul attracts attention. Reliability of signals in the fronthaul or anyhaul is a key requirement to support a centralized processing based radio access network (C-RAN) architecture or a future edge-node based network infrastructure. To ensure the signal reliability from the respect of a physical layer, radio frequency (RF) transmitting power is needed to be above a certain threshold to meet a requirement for a signal-noise ratio (SNR). However, power saving is also critical for terminal devices that are connected to the Internet, especially when Internet of Things (IOT)/Internet of Everything (IOE) is involved in the future.

SUMMARY

On the whole, embodiments of the present disclosure provide a signal processing apparatus and method and a network device.

In an aspect of the present disclosure, there is provided a signal processing apparatus. The apparatus comprises: a receiving unit configured to receive a signal from a remote radio frequency unit (RRH), the RRH being independent from the signal processing apparatus; a processing unit configured to perform signal enhancement on the signal; and a transmitting unit configured to transmit the enhanced signal to a baseband unit (BBU).

In another aspect of the present disclosure, there is provided a signal processing method. The method comprises: receiving a signal from an RRH; performing signal enhancement on the signal; and transmitting the enhanced signal to a BBU.

In a further aspect of the present disclosure, there is provided a network device. The network device comprises the above-mentioned signal processing apparatus.

In a further aspect of the present disclosure, there is provided a computer readable storage medium. The computer readable storage medium has machine executable instructions stored thereon which, when executed, cause a machine to implement the above-mentioned signal processing method.

According to solutions of embodiments of the present disclosure, it is possible to provide an improved physical layer transmission mechanism, thereby implementing a fronthaul or anyhaul solution with a high reliability, and meanwhile saving RF transmission power of a terminal device and reducing operation costs of an operator.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

Through the following detailed description with reference to the accompanying drawings, the above and other features, advantages and aspects of example embodiments of the present disclosure will become more apparent. In the drawings, identical or similar reference numbers represent the same or similar elements, in which.

DETAILED DESCRIPTION OF EMBODIMENTS

Figure 1:
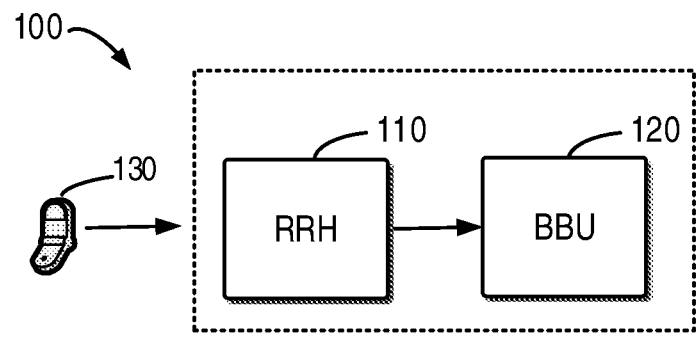
FIG. 1 illustrates a schematic diagram of a communication scenario in which an embodiment of the present disclosure may be implemented.

Embodiments of the present disclosure will be described with reference to the drawings in detail. Though some embodiments of the present disclosure are shown in the drawings, it should be appreciated that the present disclosure can be implemented in various manners and should not be interpreted as limited to the implementations described herein. Conversely, these implementations are provided for thorough and complete understanding of the present disclosure. It is to be understood that the drawings and implementations are only for the purpose of example, rather than to limit the scope of protection of the present disclosure.

The term "network device" or "base station" used herein may represent a node B (NodeB or NB), an evolved node B (eNodeB or eNB), a repeater, or a low power node such as a femto station and a pico station and the like. In the context of the present disclosure, for ease of discussion, terms "network device" and "base station" may be used interchangeably, and an eNB is mainly used as an example of a base station.

The term "terminal device" used herein refers to any terminal device or user equipment (UE) that can perform wireless communication with base stations or with each other. As an example, the terminal device may include a sensor, a detector, a mobile terminal (MT), a subscriber station (SS), a portable subscriber station (PSS), a mobile station (MS), or an access terminal (AT) having a communication function and the above vehicle-mounted devices. In the context of the present disclosure, for ease of discussion, terms "terminal device" and "user equipment" may be used interchangeably, and UE is mainly used as an example of a terminal device.

As used herein, the term "include" and its variants are to be read as open-ended terms that mean "include, but is not limited to." The term "based on" is to be read as "based at least in part on." The term "one example embodiment" is to be read as "at least one example embodiment," and the term "another embodiment" is to be read as "at least one another embodiment." Relevant definition for other terms will be given in the following depiction.

FIG. 1 illustrates a schematic diagram of a communication scenario 100 in which an embodiment of the present disclosure may be implemented. To facilitate discussion, an eNB is taken as an example of a base station below, and UE is taken as an example of a terminal device. However, it should be appreciated that this is only intended to facilitate illustration of ideas of embodiments of the present disclosure and not intended to limit the application scenarios and scope of the present disclosure in any manner.

As known in the art, a distributed base station architecture (as shown in a dotted-line block) including an RRH (e.g., RRH 110) and a BBU (e.g., BBU 120) is usually employed currently. The RRH 110 may be used to perform RF processing for a signal from the terminal device 130, and the BBU 120 may be used to perform baseband processing for the signal. Usually, one BBU may support one or more RRHs. In the case of one RRH, the RRH and BBU are connected via optical fibers and communicated via a common public radio interface (CPRI), which is called fronthaul, as shown in FIG. 1. In the case of the plurality of RRHs, the plurality of RRHs are gathered by a hub and then connected to respective BBUs via optical fibers, and communicated via Ethernet-based Common Public Radio Interface (eCPRI) protocol, which is called anyhaul or midhaul, not shown herein.

As mentioned above, there is a conflict between power saving and signal reliability in a terminal device. For example, an RF signal from the terminal device 130 is reduced to a smaller amplitude but modulated using a high-order Quadrature Amplitude Modulation (QAM) (e.g., 64QAM). However, conventionally, the RRH 110 is not sufficient to quantize a weak RF signal including a high-order QAM at a low RF transmission power (e.g., in a level of −150 dBm). Without any compensation, the BBU 120 would fail to detect and restore the RF signal.

In the already-proposed solution, it is possible to replace a 16-bit analog-to-digital converter in the RRH with a 20-bit analog-to-digital converter, or use a better low noise pre-amplifier in the RRH, or use a large oversampling rate in RRH to oversample the weak RF signal, to ensure the signal reliability. However, the implementation of these solutions requires a replacement of the conventional RRH, which consumes a lot of manpower and material resources.

Figure 2:
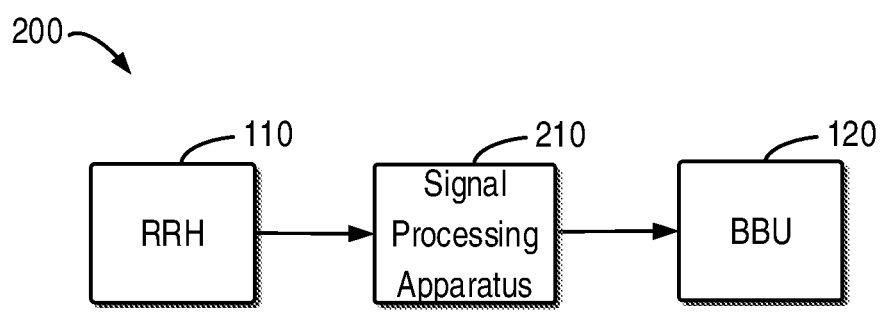
FIG. 2 illustrates a schematic diagram of an example base station architecture according to an embodiment of the present disclosure.

In view of this, the present inventor proposes an improved solution which can achieve an improvement of the signal reliability while keeping the conventional RRH unchanged. Detailed description is presented below with reference to FIG. 2. FIG. 2 illustrates a schematic diagram of an example base station architecture 200 according to an embodiment of the present disclosure.

According to the idea of the embodiment of the present disclosure, it is possible to add a signal processing apparatus 210 between the RRH 110 and the BBU 120 to achieve the signal enhancement function. This signal processing apparatus 210 is independent from the RRH 110. Specifically, it is possible to, through the signal processing apparatus 210, perform signal enhancement for the weak RF signal from the RRH 110, and then send it to the BBU 120, thereby ensuring the signal reliability without changing the conventional RRH. In this way, it is possible to permit a lower transmission power and an enhanced RF throughput of a terminal device, and reduce operation costs of an operator.

According to an embodiment of the present disclosure, the signal processing apparatus 210 may be a pluggable member, and may be connected between the RRH 110 and the BBU 120 in any proper manner. It should be appreciated that although the signal processing apparatus 210 in FIG. 2 is shown as a member independent from the RRH 110 and the BBU 120, the signal processing apparatus 210 may be arranged on the side of the RRH 110, or on the side of the BBU 120.

In addition, it should be appreciated that the embodiment of the present disclosure only involves the processing of uplink data from a terminal device to a base station. Furthermore, the idea of the embodiments of the present disclosure provides a physical layer transmission mechanism having transparency with respect to different protocols such as fronthaul or anyhaul, and thus has a very good compatibility with the currently-used CPRI or eCPRI protocol.

Although one RRH 110 is shown in FIG. 2 here, the idea of the embodiment of the present disclosure may be applied for a plurality of RRHs 110. In this case, the signals from the plurality of RRHs 110 may be gathered by a hub, then the gathered signals are processed by the signal processing apparatus 210, and then the processed signals are transmitted to the BBU 120. Although only one BBU 120 is shown in FIG. 2, it should be appreciated that the idea of the embodiment of the present disclosure may also be applied for the case of a BBU pool including a plurality of BBUs.

According to the embodiment of the present disclosure, the signal processing apparatus 210 may be implemented in any suitable manner so long as the signal enhancement function is implemented. An example implementation of the signal processing apparatus 210 is described with reference to FIG. 3.

Figure 3:
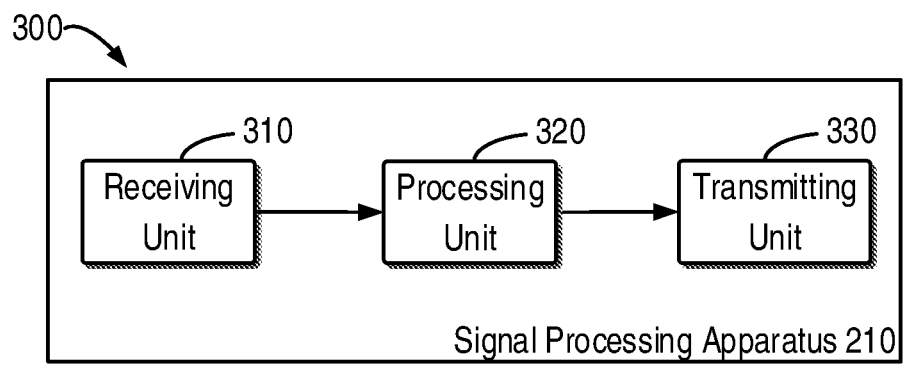
FIG. 3 illustrates a structural block diagram of a signal processing apparatus according to an embodiment of the present disclosure.

FIG. 3 illustrates a structural block diagram 300 of a signal processing apparatus according to an embodiment of the present disclosure. For example, the signal processing apparatus 210 may include a receiving unit 310, a processing unit 320 and a transmitting unit 330. The receiving unit 310 is configured to receive a signal from an RRH (e.g., the RRH 110), the processing unit 320 is configured to perform signal enhancement for the signal, and the transmitting unit 330 is configured to transmit the signal which has undergone the signal enhancement to a BBU (e.g., the BBU 120).

It should be appreciated that although the receiving unit, processing unit and transmitting unit are respectively shown as an independent element in FIG. 3, in fact they may be implemented by more or less elements. For example, the receiving unit and transmitting unit may be implemented by a single transceiver. For example, the processing unit may be implemented by one or more processors or controllers. This is by no means limited by the present disclosure.

Figure 4:
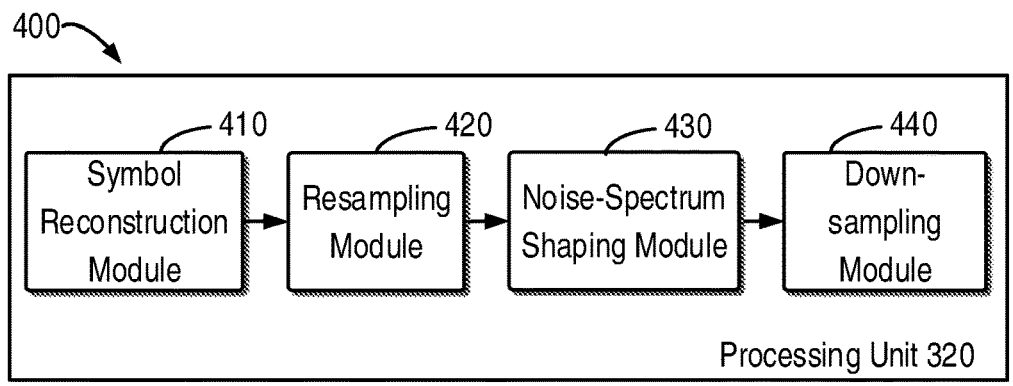
FIG. 4 illustrates a structural block diagram of a processing unit in a signal processing apparatus according to an embodiment of the present disclosure.

Reference is made below to FIG. 4 to describe an example implementation of the processing unit 320. FIG. 4 illustrates a structural block diagram 400 of a processing unit in a signal processing apparatus according to an embodiment of the present disclosure. For example, the processing unit 320 may comprise a symbol reconstruction module 410, a resampling module 420, a noise-spectrum shaping module 430 and a down-sampling module 440.

In the embodiment of the present disclosure, the symbol reconstruction module 410 is configured to convert a bit stream of the signal from the RRH into a symbol stream. According to the embodiment of the present disclosure, for example, according to an analog-to-digital converter (ADC)

resolution in the RRH, a 0-1 bit stream of the signal from the RRH may be converted into a corresponding symbol stream. In fact, regarding the coming RF signal having a very small amplitude, the ADC in the RRH cannot capture and restore details of the RF signal in the resolution, and a noise level therein is relatively higher. Therefore, it is necessary to compensate for this. Its detailed description is made below.

In the embodiment of the present disclosure, the resampling module 420 is configured to resample the symbol stream. According to the embodiment of the present disclosure, the resampling of the low-resolution symbol stream may be implemented by performing interpolation on the symbol stream and performing convolution on the interpolated signal. For example, in an embodiment, it is possible to perform the interpolation on the symbol stream by interpolating several points between two symbols at a predetermined sampling rate (e.g., m). In an embodiment, it is possible to perform the convolution on each symbol in the symbol stream by means of a kernel function.

It should be appreciated that the present disclosure is not limited to the above examples of the interpolation and convolution, but the resampling can be implemented by any suitable interpolation and convolution processing. In addition, the interpolation and convolution may be reconfigured via software according to each specific terminal device such as an IoT/IoE terminal device, so the method according to the embodiment of the present disclosure exhibits higher flexibility and controllability.

Figure 5:
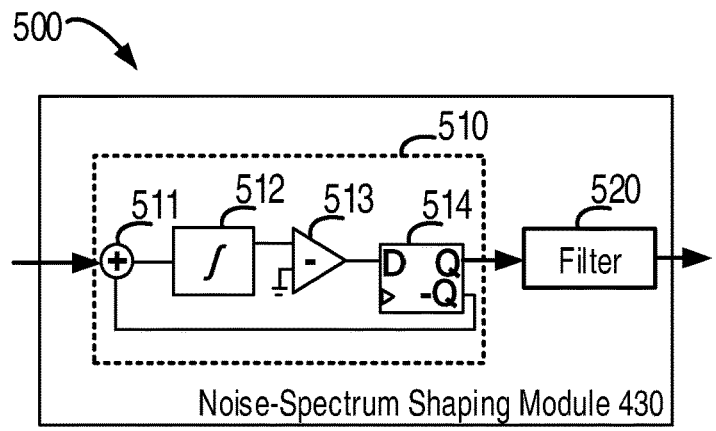
FIG. 5 illustrates a structural block diagram of a noise-spectrum shaping module in a processing unit according to an embodiment of the present disclosure.

In the embodiment of the present disclosure, the noise-spectrum shaping module 430 is configured to noise-spectrum shaping the resampled symbol stream. According to the embodiment of the present disclosure, the noise-spectrum shaping is intended to implement redistribution of a noise-spectrum and filter out of out-of-band noise, thereby achieving the signal enhancement. It should be appreciated that any suitable noise-spectrum shaper or noise-spectrum shaping circuit may be employed to implement the noise-spectrum shaping. Reference is made below to FIG. 5 to describe an example implementation of the noise-spectrum shaping module 430.

FIG. 5 illustrates an example structural block diagram 500 of a noise-spectrum shaping module in a processing unit according to an embodiment of the present disclosure. As shown in FIG. 5, the module may comprise a feedback loop 510 and a filter 520. The feedback loop 510 may be configured to perform noise-spectrum redistribution on the resampled symbol stream, whereby the noise-spectrum is migrated out of the band (e.g., higher frequency band). The filter 520 may be configured to perform filtering on the noise-spectrum redistributed symbol stream, thereby filtering away the out-of-band noise so that the signal has a smaller noise and is enhanced.

According to the embodiment of the present disclosure, the feedback loop 510 may comprise an adder 511, an integrator 512, a comparator 513 and a D flip-flop 514. One input of the adder 511 receives the resampled symbol stream, and another input receives a negative output from the D flip-flop 514. Input of the integrator 512 receives output from the adder 511. One input of the comparator 513 receives output from the integrator 512, and another input is connected with a reference potential (e.g., grounded). Input of the D flip-flop 514 receives output from the comparator 513, and its positive output is connected to the filter 520. It should be appreciated that the feedback loop is not limited to the shown configuration, but can be implemented by using any suitable configuration.

According to the embodiment of the present disclosure, the filter 520 may be a low-pass filter. It may be appreciated that the filter 520 may employ other suitable types of filters according to needs.

Figure 6:
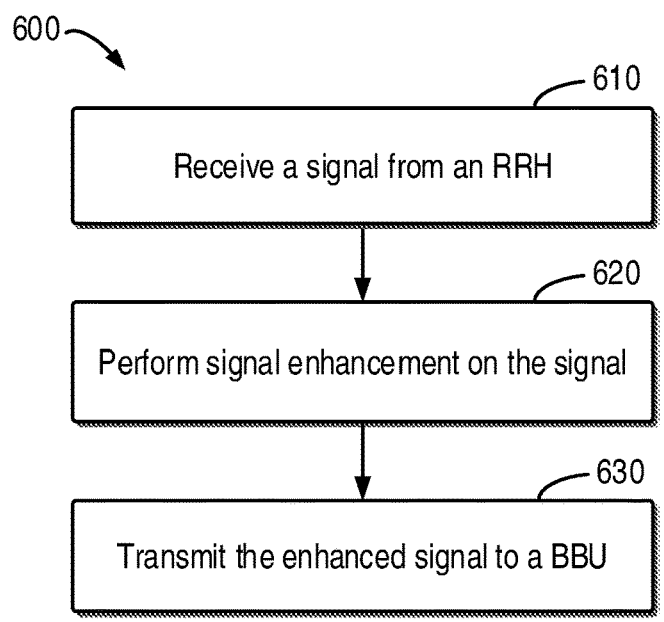
FIG. 6 illustrates a flow chart of a signal processing method according to an embodiment of the present disclosure.

The noise-spectrum shaping module stated above with reference to FIG. 6 is a first-order noise-spectrum shaper. It should be appreciated that it is possible to select and use higher-order noise-spectrum shaper according to needs and acceptable complexity. The higher-order noise-spectrum shaper will not be listed one by one here.

The example implementation of the noise-spectrum shaping module is described above. Now returning to FIG. 4, in the embodiment of the present disclosure, the down-sampling module 440 is configured to perform down-sampling processing on the noise-spectrum shaped symbol stream. The original symbol stream is reconfigured according to the sampling rate (e.g., m) in the resampling module 420. The original symbol stream has the same length, but the noise is substantially reduced.

In this way, according to the solution of the embodiment of the present disclosure, the noise moves to higher frequency bands through resampling and noise-spectrum shaping and filtering, so that the in-band noise substantially reduces and a clear low-frequency band signal is obtained. The low-frequency band signal is transmitted to the BBU so that it is detected and restored intact. Therefore, signal reliability is ensured.

Correspondingly, the embodiment of the present disclosure provides a signal processing method. Detailed depictions will be presented with reference to FIG. 6 and FIG. 7. FIG. 6 illustrates a flow chart of a signal processing method 600 according to an embodiment of the present disclosure. The method 600 for example may be implemented at the signal processing apparatus 210 in FIG. 2.

As shown in FIG. 6, at 610, the signal processing apparatus 210 may receive the signal from the RRH 110. In the case of a low power terminal device involving IoT/IoE, the signal is a weak RF signal with a low resolution.

At 620, the signal processing apparatus 210 may perform signal enhancement for the received signal. According to the embodiment of the present disclosure, signal enhancement may be implemented through resampling and noise-spectrum shaping and filtering. An example implementation process is described below with reference to FIG. 7.

Figure 7:
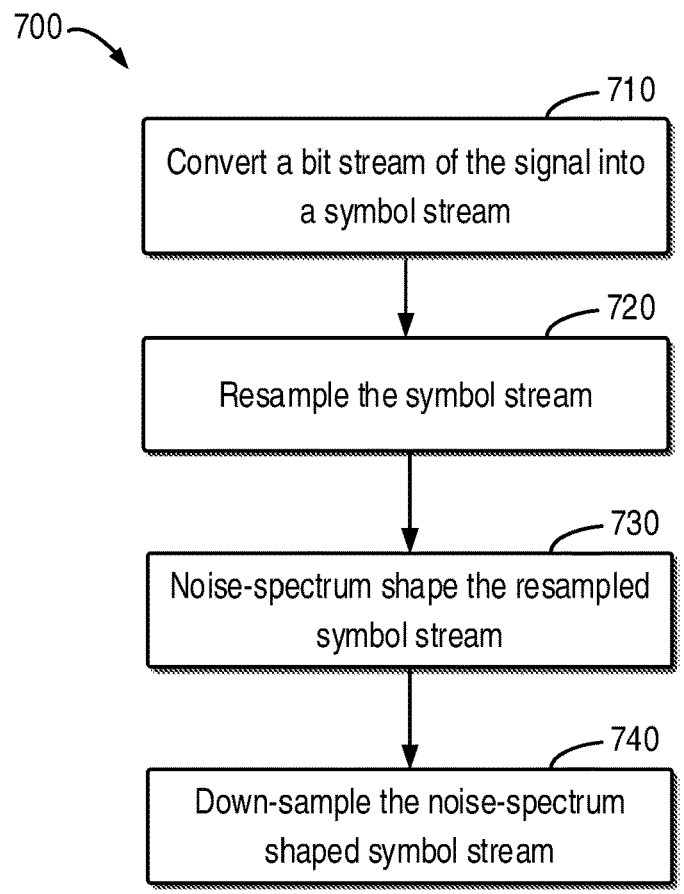
FIG. 7 illustrates a flow chart of a method for signal enhancement according to an embodiment of the present disclosure.

FIG. 7 illustrates a flow chart of a method 700 for signal enhancement according to an embodiment of the present disclosure. As shown in FIG. 7, at 710, the bit stream of the signal may be converted into a symbol stream to implement symbol reconstruction for subsequent processing. The processing in this step is similar to the operation described above in conjunction with the symbol reconstruction module 410, and will not be detailed any more here.

At 720, perform resampling processing for the symbol stream. According to the embodiment of the present disclosure, for example it is possible to implement resampling by performing interpolation and convolution on each symbol in the symbol stream. The processing in this step is similar to the operation described above in conjunction with the resampling module 420, and will not be detailed any more here.

At 730, it is possible to perform noise-spectrum shaping processing for the symbol stream which has undergone the resampling processing. According to the embodiment of the present disclosure, it is possible to perform noise-spectrum redistribution on the resampled symbol stream, and perform filtering on the noise-spectrum redistributed symbol stream. This may be implemented by any suitable noise-spectrum shaper or noise-spectrum shaping circuit. According to the embodiment of the present disclosure, it is possible to perform noise-spectrum redistribution on the resampled symbol stream via the feedback loop. For example, reference is made to the circuit described with reference to FIG. 5. According to the present embodiment, it is possible to, respectively via first input and second input of the adder 511 of the feedback loop 510, receive the resampled symbol stream and negative output from the D flip-flop 514; provide output from the adder 511 to the integrator 512; use the comparator 513 to compare output from the integrator and the reference potential; and provide a comparison result of the comparator 513 to the D flip-flop 514. The positive output of the D flip-flop 514 is connected to the filter 520 and used to perform filtering on the noise-spectrum redistributed symbol stream. The processing in this step is similar to the operation described above in conjunction with the noise-spectrum shaping module 430, and will not be detailed any more here.

At 740, it is possible to perform down-sampling processing on the symbol stream which has undergone noise-spectrum shaping processing, thereby implementing regeneration of the symbol. As compared with the original symbol at step 710, the regenerated symbol has the same length, but noise is substantially reduced.

Returning to FIG. 6, at 630, the signal processing apparatus 210 sends the signal after the signal enhancement (namely the regenerated symbol stream in step 740) to the BBU 120. Therefore, the BBU 120 may detect and restore a high-order QAM signal having a proper intensity.

So far, the signal processing method is described, it corresponds to the operations of the signal processing apparatus described above with reference to FIG. 2 through FIG. 5, and other processing details may be found from the above depictions with reference to FIG. 2 through FIG. 5, and will not be detailed any more here.

According to example embodiments of the present disclosure, it is possible to substantially reduce the transmission power of the terminal device and enable the service life of the battery of the terminal device to increase. In addition, it is applicable to the high-order QAM in a wireless system. Furthermore, wireless makes changes to wireless processing of wireless components in the current network architecture, and is adapted for currently-used various fronthaul or anyhaul protocols such as CPRI or eCPRI.

Figure 8:
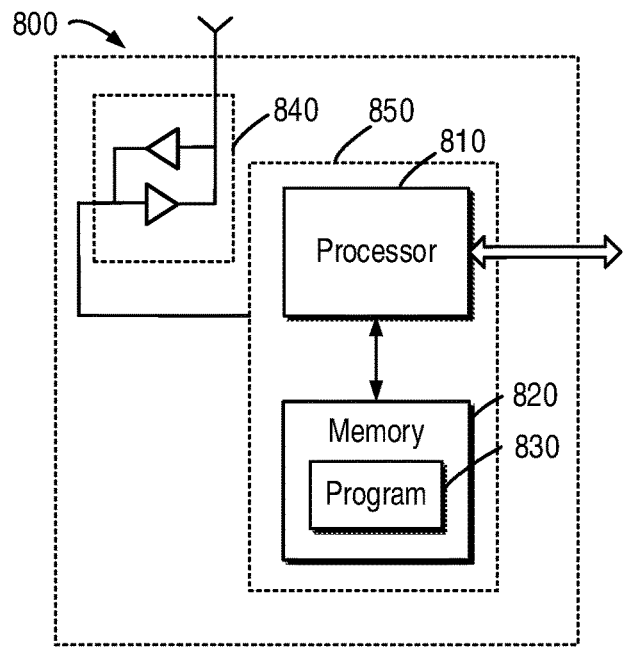
FIG. 8 illustrates a simplified block diagram of a device adapted to implement embodiments of the present disclosure.

FIG. 8 illustrates a simplified block diagram of a device 800 adapted to implement embodiments of the present disclosure. The device 800 may be used to implement the signal processing apparatus according to embodiments of the present disclosure (e.g., the signal processing apparatus 210 of FIG. 2).

As shown in the figure, the device 800 comprises one or more processors 810, one or more memories 820 coupled to the processor 810, and one or more transmitters and/or receivers (TX/RX) 840 coupled to the processor (s) 810.

The processor 810 may be in any suitable type adapted for local technical environment, and may include but not limited to one or more of a general-purse computer, a dedicated computer, a microcomputer, a digital signal processor (DSP) and a process-based multi-core processor architecture. The device 800 may also include a plurality of processors, for example a dedicated integrated circuit chip temporally following a clock synchronous with a main processor.

The memory 820 may be in any suitable type adapted for local technical environment, and may be implemented using any suitable data storage technology. Non-restrictive examples of the memory are for example a non-transient computer-readable storage medium, a semiconductor-based storage device, a magnetic storage device and system, an optical storage device and system, a fixed memory and a removable memory.

The memory 820 stores at least part of the program 830. TX/RX 840 is used for bidirectional communication. The TX/RX 840 has at least one antenna to promote communication. However, in practice the device may have several antennas. The communication interface may represent any interface needed in communicating with other network elements.

The program 830 may comprise a program instruction. The program instruction, when executed by the associated processor 810, enables the device 800 to operate according to the embodiment of the present disclosure, as stated with reference to FIG. 3 through FIG. 7. That is to say, embodiments of the present disclosure may be implemented by computer software executed by the processor 810 of the device 800, or implemented by hardware, or implemented by software and hardware in combination.

Generally, various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing device. When various aspects of the present invention are illustrated or described into block diagrams, flowcharts, or other graphical representations, it would be appreciated that the block diagrams, apparatus, system, technique or method described here may be implemented, as non-restrictive examples, in hardware, software, firmware, dedicated circuit or logic, common software or controller or other computing device, or some combinations thereof. Examples for implementing hardware devices of embodiments of the present disclosure comprise but not limited to: a field-programmable gate arrays (FPGA), Application Specific Integrated Circuit (ASIC), Application Specific Standard Parts (ASSP), System on Chip (SOC), Complex Programmable Logic Device (CPLD) and the like.

As an example, the implementations of the subject matter disclosed herein can be described in a context of machine-executable instructions which are included, for instance, in the program module executed in the device on a target real or virtual processer. Generally, a program module includes routine, program, bank, object, class, component and data structure, etc. and performs a particular task or implements a particular abstract data structure. In the implementations, the functions of the program modules can be combined or divided among the described program modules. The machine executable instructions for the program module can be executed in a local or distributed device. In the distributed device, the program module can be located between the local and remote storage mediums.

The computer program code for implementing the method of the present disclosure may be complied with one or more programming languages. These computer program codes may be provided to a general-purpose computer, a dedicated computer or a processor of other programmable data processing apparatus, such that when the program codes are executed by the computer or other programmable data processing apparatus, the functions/operations prescribed in the flowchart and/or block diagram are caused to be implemented. The program code may be executed completely on a computer, partially on a computer, partially on a computer as an independent software packet and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium includes, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular implementation of a particular invention. In the present invention, some features described in the context of separate implementations may also be integrated into a single implementation. On the contrary, various features described in the context of a single implementation may also be separately implemented in a plurality of implementations or in any suitable sub-group.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A signal processing apparatus, comprising:
    a receiving unit configured to receive a signal from a remote radio frequency unit (RRH), the RRH being independent from the signal processing apparatus;
    a processing unit configured to perform signal enhancement on the signal; and
    a transmitting unit configured to transmit the enhanced signal to a baseband unit (BBU);
    wherein the processing unit comprises:
    a symbol reconstruction module configured to convert a bit stream of the signal into a symbol stream;
    a resampling module configured to resample the symbol stream;
    a noise-spectrum shaping module configured to noise-spectrum shape the resampled symbol stream; and
    a down-sampling module configured to down-sample the noise-spectrum shaped symbol stream.

2. The apparatus according to claim 1, wherein the resampling module comprises:
    an interpolation module configured to perform interpolation on the symbol stream; and
    a convolution module configured to perform convolution on the interpolated symbol stream.

3. The apparatus according to claim 1, wherein the noise-spectrum shaping module comprises:
    a feedback loop configured to perform noise-spectrum redistribution on the resampled symbol stream; and
    a filter configured to filter the noise-spectrum redistributed symbol stream.

4. The apparatus according to claim 3, wherein the feedback loop comprises:
    an adder having a first input to receive the resampled symbol stream and a second input to receive a negative output from a D flip-flop;
    an integrator having an input to receive an output from the adder;
    a comparator having a first input to receive an output from the integrator and a second input connected to a reference potential; and
    the D flip-flop having an input to receive an output from the comparator and a positive output connected to the filter.

5. A network device, comprising the apparatus according to claim 1.

6. A signal processing method, comprising:
    receiving a signal from a remote radio frequency unit (RRH);
    performing signal enhancement on the signal; and
    transmitting the enhanced signal to a baseband unit (BBU);
    wherein performing signal enhancement on the signal comprises:
    converting a bit stream of the signal into a symbol stream;
    resampling the symbol stream;
    noise-spectrum shaping the resampled symbol stream; and
    down-sampling the noise-spectrum shaped symbol stream.

7. The method according to claim 6, wherein resampling the symbol stream comprises:
    performing interpolation on the symbol stream; and
    performing convolution on the interpolated symbol stream.

8. The method according to claim 6, wherein noise-spectrum shaping the resampled symbol stream comprises:
    performing noise-spectrum redistribution on the resampled symbol stream; and
    filtering the noise-spectrum redistributed symbol stream.

9. The method according to claim 8, wherein performing noise-spectrum redistribution on the resampled symbol stream comprises:
    performing noise-spectrum redistribution on the resampled symbol stream via a feedback loop, comprising:
    receiving a negative output from a D flip-flop and the resampled symbol stream, respectively, via a first input and a second input of an adder in the feedback loop;
    providing an output from the adder to an integrator;
    comparing an output from the integrator with a reference potential using a comparator; and
    providing a comparison result of the comparator to the D flip-flop, a positive output of the D flip-flop being connected to a filter for performing the filtering.

10. A non-transitory computer readable storage medium having machine executable instructions stored thereon which, when executed, cause a machine to implement the method according to claim 6.

* * * * *